Feb. 9, 1932.  J. GRANT  1,844,355
SWINGING CUTTER REAMER
Filed May 5, 1928  2 Sheets-Sheet 1
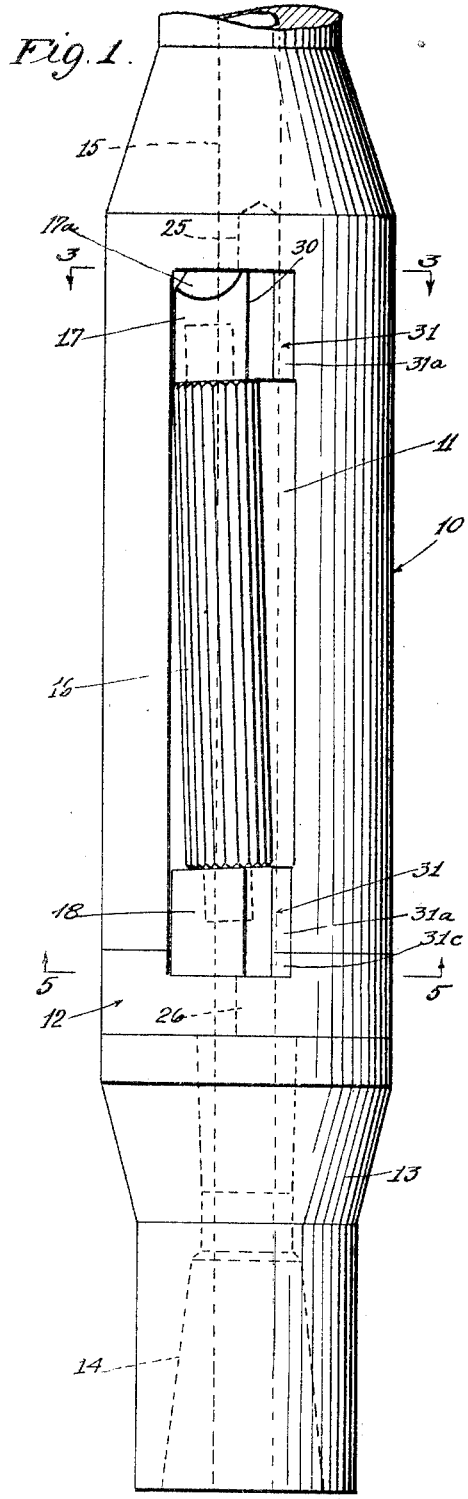
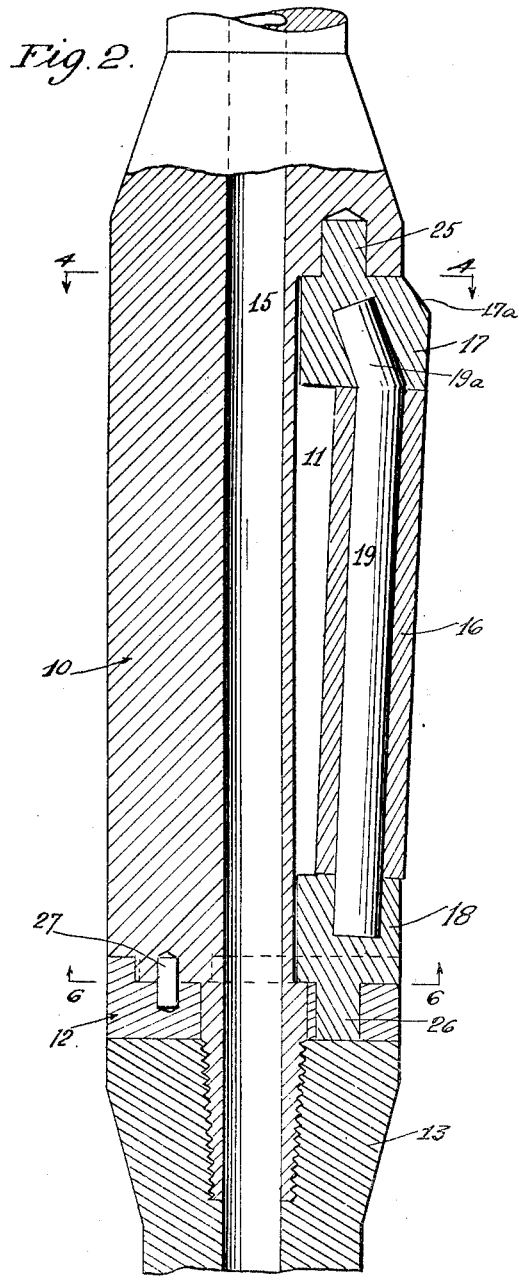
Inventor
John Grant.
Attorney Feb. 9, 1932.   J. GRANT   1,844,355
SWINGING CUTTER REAMER
Filed May 5, 1928   2 Sheets-Sheet 2
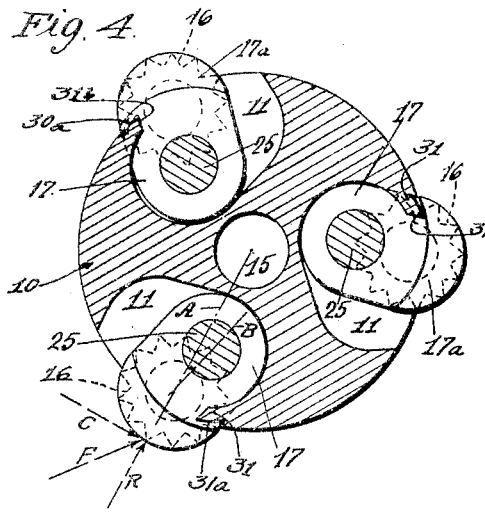
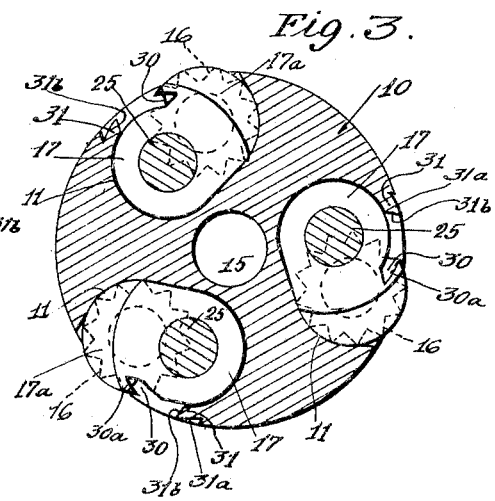
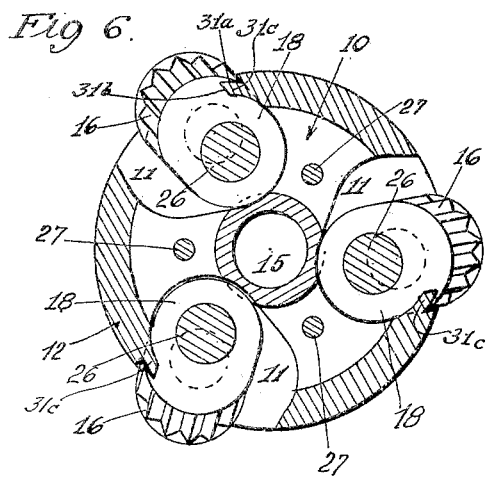
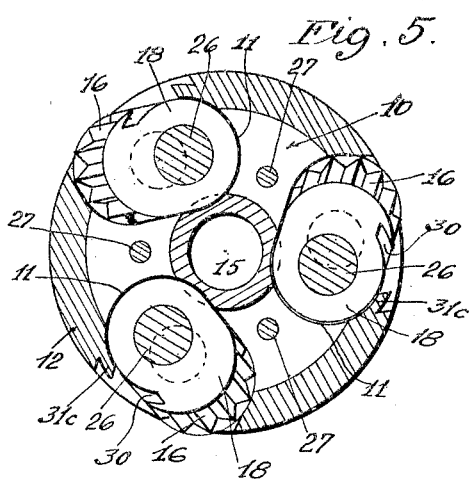
Inventor.
John Grant
Attorney.

Patented Feb. 9, 1932

1,844,355

UNITED STATES PATENT OFFICE

JOHN GRANT, OF LOS ANGELES, CALIFORNIA

SWINGING CUTTER REAMER

Application filed May 5, 1928. Serial No. 275,342.

This invention has relation to expanding reamers of the swinging cutter type, it being a general object of the invention to provide an improved form of swinging cutter type reamer in which the strains and thrusts incident to reaming are transferred directly from the cutter or cutter carrier to the body, without having to be transferred through the pivot pins or other pivotal connections of the cutter or carrier with the body. Generally speaking, it is an object of this invention to provide a reamer that is simple and strong and is fully capable of withstanding the very large stresses which are imposed upon a reamer in actual operation. As is well known by those familiar with the art, such stresses are exceptionally large and it is necessary, in any successful reamer, to provide for their direct transfer to the body.

The stresses and thrusts to which a reaming cutter is subjected are made up of two forces: one of which is a force acting substantially circumferentially of the reamer, being the reaction force incident to the actual rotary cutting operation, and the other of which is a squeezing force acting substantially radially upon the cutter and due to the fact that the cutters are being constantly forced downwardly in the hole by the weight imposed upon the reamer. The result of these two forces is a force acting obliquely upon the cutter. That final resultant force should not only be supported upon and transferred directly from the cutter or cutter carrier to the reamer body, but it must be transferred in such a manner, with relation to its direction and with relation to the position of the cutter or cutter carrier, that the resultant force tends at all times to keep the cutter swung around to its expanded position. Otherwise the force will tend to contract the cutter and no reaming will be done.

The present application deals with a novel manner and arrangement of supporting a swinging cutter or cutter carrier, and will be best understood from the following detailed description of a typical and preferred design embodying the invention, reference for this purpose being had to the accompanying drawings, in which:

Figure 1 is a side elevation of a reamer embodying the invention, the cutter being shown in its collapsed position;

Fig. 2 is a central longitudinal section of the same, showing the cutter in its protracted or expanded position;

Figs. 3 and 4 are, respectively, cross-sections on lines 3—3 and 4—4 of Figs. 1 and 2, showing the cutters in expanded and contracted positions, and Figs. 5 and 6 are similar sections, respectively, on lines 5—5 and 6—6 of Figs. 1 and 2.

The typical design, which I illustrate in the accompanying drawings, shows a reamer body 10 which may preferably be made mainly of a single solid piece, recessed as shown at 11 to take the cutters, allowing them to swing back to their contracted positions as shown in Figs. 1, 3 and 5, and in those positions to be housed within the body. The body includes also, for convenience of manufacture and assembly, a collar 12 held between the part 10 and a sub 13 which is screw-threadedly connected to the body at its lower end, this sub 13 being provided with the usual tool joint box 14 at its lower end for connection with a drill bit. The upper end of the body part 10 will be provided, as usual (but not shown in the drawings) with the usual tool joint connection for attachment to a drill stem; and the body has a water circulation passage 15 extending through it and on down through the sub 13 to supply circulating water to the drill bit below.

The swinging cutters of the type of reamer which I here describe may be of any suitable type and character. They may be either plain cutters—cutters of what are known as the shale cutting type—or they may be provided with inset cutting elements of any desired kind. Where the cutters comprise a cutting element which is physically a piece or member separate from the body of the cutter, then the cutters are comprised of what may be termed the ultimate cutting element and of a cutter carrier. Thus, in the drawings I show each cutter as comprising an ultimate cutting element in the form of a roller cutter 16 mounted on a cutter carrier which, in this particular case, is illustrated as comprising upper and lower heads 17 and 18 and an interconnecting stem 19 which also forms the shaft or stem for the roller 16. Preferably the carrier parts 17, 18 and 19 form a rigid entity, the roller 16 rotating on the stem 19 and that stem being rigidly joined with the two heads. In order to effect such rigid juncture, to prevent stem 19 from rotating with roller 16 and to insure at all times that the heads 17 and 18 will be maintained in proper alinement relation to each other, the stem 19 may be rigidly joined with the two heads in any suitable manner. As an improvement in regard to such features I here show one end 19a of stem 19 bent sharply at an angle and fitting tightly in correspondingly inclined bore in head 17. This inclined end may be forced tightly into the bore or it may be shrunk therein, or otherwise tightly held. Likewise the straight end of the stem may preferably be tightly fitted or held in lower head 18; but removably, in order that a worm roller may be removed for replacement. These provisions prevent any relative rotation of the stem 19 and prevent any relative dislocation of the two heads 17 and 18; and thus the heads and the stem become in effect a rigid cutter carrier entity.

The cutter, however it may be formed, swings upon a substantially vertical axis in the body, which axis is here represented by the upper and lower pivot pins 25 and 26 which are located upon common vertical axes. The upper pivot pins 25 fit into bores in the upper part of body 10 above recesses 11; while the lower pivot pins 26 fit into corresponding bores in the collar 12, this collar being doweled to the body with pins 27 so as to locate the pivot receiving bores in the collar in proper alinement with the upper pivot receiving bores of the body.

Being thus mounted on vertical axes the cutters are capable of swinging horizontally between the collapsed and expanded positions shown in the drawings. In their contracted positions they swing back into and are housed within the body recesses, projecting only slightly beyond the body periphery. When the tool has been lowered in the hole below the casing, right-handed rotation (looking down upon it) will cause the cutters to be thrown outwardly by centrifugal force or by drag upon the wall of the hole, causing the cutters to assume the expanded positions shown in Figs. 4 and 6. In these expanded positions the cutters are not exactly radial with reference to the center of the body, as being stopped, they cannot swing far enough to reach such a radial position. This maintenance of the cutters always in non-radial positions is necessary in order that the cutters may be positively collapsed by casing engagement, and without the necessity of rotating the tool left-handedly. Thus each upper head 17 is provided at its upper outer edge with a bevelled surface 17a to engage the lower end of the casing or the casing shoe when the reamer is pulled up into the casing. The outer bevelled end of the head 17 lying non-radially with respect to the center of pivot 25 and the center of the body, the downward pressure of the casing upon the bevelled surface 17a swings the cutter carrier around toward its collapsed position, forcing the cutters into the body recesses so that the tool can then pass up through the casing.

The arrangements which are now to be described are those which I provide for directly supporting the cutters in their proper expanded positions and supporting them against all the thrusts to which they are subjected. An understanding of the nature of the thrust and of the nature of the support will be best understood now by reference to Fig. 4. Here I have indicated the circumferential force by the arrow C, the radial force by the arrow R and the resultant force by the arrow F. The relative magnitudes of the forces C and R may and do vary very greatly, depending upon the instant conditions which are being met by the tool. Consequently the magnitude and direction of the resultant force F may and does vary substantially, but the direction indicated in Fig. 4 may be taken as typical, although the direction of F may at times be more nearly parallel to C and at other times more nearly parallel to R. It will be readily understood from a consideration of the nature of the situation that if F becomes so nearly parallel to R that the angle between F and R is less than what may be termed the non-radial angle of the cutter, then the resultant force will tend to collapse the cutter. This angle of non-radiality of the cutter carrier is indicated in Fig. 4 by the angle between the lines A and B; and this angle is, for reasons which will now be understood, made as small as is consistent with dependable casing collapsing action on the cutter. Making the non-radial angle small, then the direction of the resultant force F will always be such that, although it tends to thrust the cutter inwardly, it also tends to throw it around toward, and to keep it in, its expanded position. With the cutter in its expanded position and subjected to the described forces and the resultant stresses, the supporting bearings for the cutter carrier, now to be described, are such that the force exerted upon the cutters never tends to move the carrier away from its support, rather tending at all times to move it back against its support.

Considering an upper carrier head 17, it will be seen that the head is provided with a notch 30 (see Fig. 3 where they can be most clearly seen). In the expanded position this notch 30 takes a lug or rib 31 which is formed on the body at the outer edge of the cutter receiving recess 11. The outer face 31a of supporting rib 31 is here shown as being substantially circumferential about the center of pivot pin 25. Likewise the outer wall face 30a of the notch 30 is concentric about the center of pivot pin 25—concentric about the swinging axis of the cutter carrier. Thus when the cutter is in the expanded position of Fig. 4, with the surfaces 30a and 31a in engagement, no force, unless it be a force that positively acts to swing the cutter toward collapsed position, can, by reaction of the supporting surfaces 30a and 31a, tend to move the cutter toward its collapsed position. It will be seen from an inspection of Fig. 4 that the action of a force like that indicated at F tends to keep the cutter in expanded position for two reasons: in the first place the force of F positively tends to rotate the cutter around against the lug or rib 31, these forces being transferred directly from the cutter carrier to the rib. And the action of force F which tends to press the cutter inwardly toward the body also, through the interaction of the surfaces 30a and 31a, has the result of holding the cutter more securely in its expanded position. This action will be understood when it is considered that these surfaces 30a and 31a are angular in relation to center lines A and B, so that even a radial force along either of these lines will, by the interaction of the two surfaces, tend to move the cutter around to, and hold it in, its expanded position. And it will also be understood how the interengagement of the surfaces 30a and 31a take all the inward stresses and thrusts imposed upon a cutter and prevents those stresses and thrusts from being transferred to the body through the pivot pins. And the thrust receiving action of the ribs 31 may further be readily understood by a consideration of its relative position "behind" the cutter and more or less in the direct line of thrust upon the cutter. The end surface 31b of the rib and the outer face 31a take all or substantially all of the forces and thrusts which are imposed upon the cutter and thus transfer them directly to the body.

The thrust transferring arrangement which has now been described for the upper head 17 is also provided for the lower head 18, the same arrangement of thrust taking ribs and head recessed being provided there; and the corresponding elements and parts being designated by the same numerals in Figs. 5 and 6 as in Figs. 3 and 4. The only structural difference between the arrangements at the lower ends of the cutter carriers is this: that the lowermost part of the lower thrust taking rib 31 is formed in the collar 12, as indicated at 31c in Fig. 1. The general structure and functions are, however, the same as have been described.

In order to allow the thrust ribs and the head recesses to act freely as described, and to take all the thrusts without subjecting the pivot pins to any thrusts, and also in order to make the parts freely movable between collapsed and expanded positions, the pivot pins 25 and 26 may be made to fit a little loosely or at least freely in their bores; and if desired the heads 17 and 18 may be so fitted in recesses 11 that they do not bear or rub against the rear parts of those recesses.

I claim:—

1. An expanding reamer of the character described, comprising a body, a cutter carrier mounted on a vertical axis in said body to swing between retracted and protracted positions, the cutter carrier having a notch in its rearward side and the body having a corresponding rib which is engaged by the notch when the cutter carrier is in expanded position, and a cutting element carried by said cutter carrier.

2. An expanding reamer of the character described, comprising a body, a cutter carrier mounted on a vertical axis in said body to swing between retracted and protracted positions, the cutter carrier having a notch in its rearward side and the body having a corresponding rib which is engaged by the notch when the cutter carrier is in expanded position, the outer face of said rib and the outer face of said notch lying at an angle to a radial plane through the protracted cutter carrier, and a cutting element carried by said cutter carrier.

3. An expansive reamer of the character described, comprising a body, a cutter carrier mounted to swing on a vertical axis in said body, said cutter carrier projecting laterally from its axis so that its outer edge may swing between a retracted position and a protracted position in which its outer edge projects outwardly from and beyond the body, the cutter carrier having on its rearward face near its outer end an inwardly facing surface and the body having a corresponding outwardly facing surface with which the inwardly facing surface engages when the cutter carrier is protracted, and a cutting element carried by said cutter carrier.

4. An expansive reamer of the character described, comprising a body, a cutter carrier mounted to swing on a vertical axis in said body, said cutter carrier projecting laterally from its axis so that its outer edge may swing between a retracted position and a protracted position in which its outer edge projects outwardly from and beyond the body, the cutter carrier having on its rearward face near its outer end an inwardly facing surface and the body having a corresponding outwardly facing surface which is overhung by said inwardly facing surface when the cutter carrier is in protracted position, and a cutting element carried by said cutter carrier.

5. An expansive reamer of the character described, comprising a body, a cutter carrier mounted to swing on a vertical axis in said body, said cutter carrier projecting laterally from its axis so that its outer edge may swing between a retracted position and a protracted position in which its outer edge projects outwardly from and beyond the body, the cutter carrier having on its rearward face near its outer end an inwardly facing surface, and the body having a corresponding outwardly facing surface, said surface lying at an angle to a radial plane through the protracted cutter carrier, and a cutting element carried by said cutter carrier.

6. An expansive reamer of the character described, comprising a body, a cutter carrier mounted to swing on a vertical axis in said body, said cutter carrier projecting laterally from its axis so that its outer edge may swing between a retracted position and a protracted position in which its outer edge projects outwardly from and beyond the body, the cutter carrier having on its rearward face near its outer end an inwardly facing surface and the body having a corresponding outwardly facing surface, said surface lying at an acute angle to a radial plane through the protracted cutter carrier, and a cutting element carried by said cutter carrier.

7. An expansive reamer of the character described, comprising a recessed body, a cutter carrier mounted to swing upon a vertical axis in said body, said cutter carrier projecting laterally from its axis and adapted in a retracted position to be housed within the body recess and in a protracted position to project from and beyond the body, said cutter carrier comprising a swinging head, said head having near its outer end an inwardly facing surface, and the body having a corresponding outwardly facing surface which is overhung by said inwardly facing surface when the cutter carrier is in protracted position, and a cutting element carried by said cutter carrier.

8. An expansive reamer of the character described, comprising a recessed body, a cutter carrier mounted to swing upon a vertical axis in said body, said cutter carrier projecting laterally from its axis and adapted in a retracted position to be housed within the body recess and in a protracted position to project from and beyond the body, said cutter carrier comprising a swinging head, said head having near its outer end an inwardly facing surface, and the body having a corresponding outwardly facing surface which is overhung by said inwardly facing surface when the cutter carrier is in protracted position, said surfaces lying at an acute angle to a radial plane through the center of the body and the outer edge of the protracted cutter carrier, and a cutting element carried by said cutter carrier.

9. An expansive reamer of the character described, comprising a body, a cutter carrier mounted to swing on a vertical axis in said body, said cutter carrier projecting laterally from its axis so that its outer edge may swing between a retracted position and a protracted position in which its outer edge projects outwardly from and beyond the body, the body having an outwardly facing surface and the cutter carrier having an inwardly facing surface which overhangs and bears inwardly against the body surface when the cutter carrier is protracted, thereby to transmit inwardly directed stresses from the cutter carrier to the body, and a cutting element carried by said cutter carrier.

In witness that I claim the foregoing I have hereunto subscribed my name this 16th day of April, 1928.

JOHN GRANT.